US008104590B2

(12) United States Patent  
Fortuna et al.

(10) Patent No.: US 8,104,590 B2  
(45) Date of Patent: Jan. 31, 2012

(54) RAILCAR BRAKE HEAD

(75) Inventors: Rudolph S. Fortuna, Brookfield, WI (US); Joseph Centeno, Kenosha, WI (US)

(73) Assignees: Powerbrace Corporation, Kernosha, WI (US); Miner Enterprises, Inc., Geneva, IL (US)

( * ) Notice: Subject to any disclaimer, the term of this patent is extended or adjusted under 35 U.S.C. 154(b) by 1213 days.

(21) Appl. No.: 11/810,786

(22) Filed: Jun. 7, 2007

(65) Prior Publication Data

US 2008/0302617 A1 Dec. 11, 2008

(51) Int. Cl.  
F16D 65/04 (2006.01)

(52) U.S. Cl. .......................................... 188/243; 188/236

(58) Field of Classification Search .................. 188/236, 188/243, 242, 237, 234  
See application file for complete search history.

(56) References Cited

U.S. PATENT DOCUMENTS

| | | | |
|---|---|---|---|
| 1,910,541 A | 5/1933 | Harbert | |
| 1,924,376 A * | 8/1933 | Pogue | 188/243 |
| 1,937,129 A * | 11/1933 | Fitz | 188/243 |
| 2,107,821 A | 2/1938 | Busch | |
| 2,109,722 A | 3/1938 | Fawick | |
| 2,253,031 A | 8/1941 | Johnson | |
| 2,747,264 A | 5/1956 | Buvelot | |
| 2,900,711 A | 8/1959 | Wilson | |
| 2,974,759 A | 3/1961 | Tack et al. | |
| 3,077,957 A | 2/1963 | Arrasmith | |
| 3,088,557 A | 5/1963 | Cabble, Jr. et al. | |
| 3,124,221 A * | 3/1964 | Prentice | 188/243 |
| 3,707,209 A * | 12/1972 | Bridigum | 188/220.6 |
| 3,976,170 A | 8/1976 | Spaeth | |
| 4,000,792 A | 1/1977 | Guldin | |
| 4,020,928 A * | 5/1977 | Beetle | 188/237 |
| 4,466,513 A | 8/1984 | Dedek | |
| 5,560,453 A | 10/1996 | Conrad | |
| 5,595,267 A | 1/1997 | Kahr | |
| 5,647,460 A * | 7/1997 | Shute | 188/243 |
| 5,704,454 A | 1/1998 | Kahr | |
| 5,810,124 A | 9/1998 | Sandmann | |
| 5,839,549 A * | 11/1998 | Tack, Jr. | 188/243 |
| 6,336,532 B1 | 1/2002 | Samolowicz | |
| 6,581,732 B1 * | 6/2003 | Shute et al. | 188/242 |
| 6,932,535 B2 | 8/2005 | De La Fuente-Farias | |
| 2006/0272908 A1 | 12/2006 | East et al. | |

OTHER PUBLICATIONS

International Searching Authority/USPTO; International Search Report regarding PCT/US2008/06539; Sep. 15, 2008; 3 pages. International Searching Authority/USPTO; Written Opinion of the International Searching Authority regarding PCT/US2008/06539; Sep. 15, 2008; 5 pages.

* cited by examiner

Primary Examiner — Bradley King  
Assistant Examiner — Thomas Irvin  
(74) Attorney, Agent, or Firm — Law Office of John W. Harbst

(57) ABSTRACT

A railcar brake head having an upper end, a lower end, and a pair of sides. The brake head further includes an elongated concave keyway defining an elongated axis and opening to the upper and lower ends of the brake head. At least a portion of the keyway is defined between a rear wall and spaced transversely extending upper and lower lugs. A front surface of each lug is adapted for mounting engagement with a brake shoe. The longitudinal spacing between the centralized upper and lower lugs is such that a keybridge extending from a rear face of the brake shoe is received and accommodated therebetween whereby inhibiting endwise movement of the brake shoe relative to the brake head. The centrally disposed upper lug on the brake head is configured with a camming surface, a longitudinal portion of which is arranged relative to the keyway for guiding and facilitating movement of a free end of an elongated key downwardly past the upper lug whereby permitting the key to establish a proper locking relation with the keybridge of the brake shoe.

16 Claims, 4 Drawing Sheets

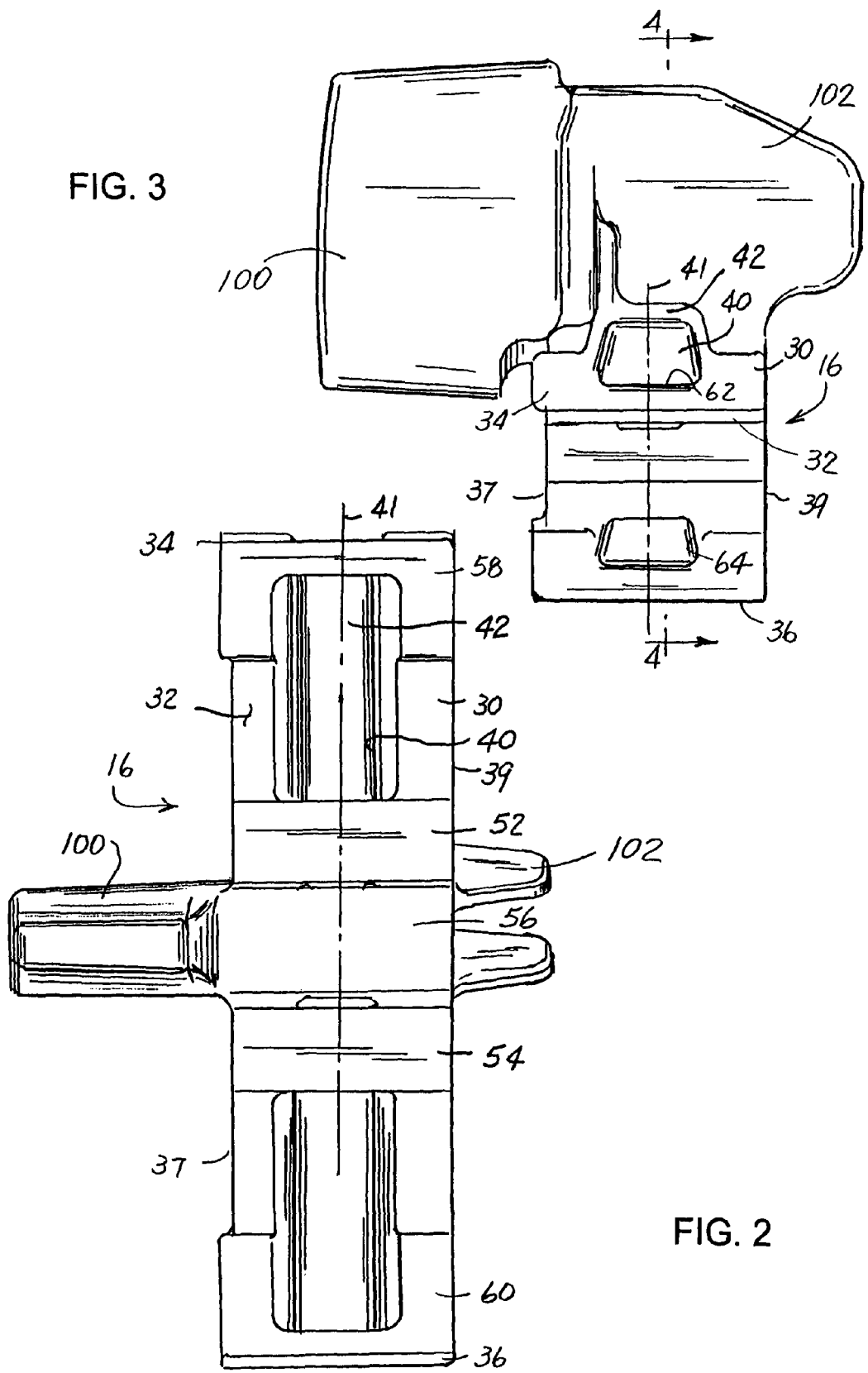

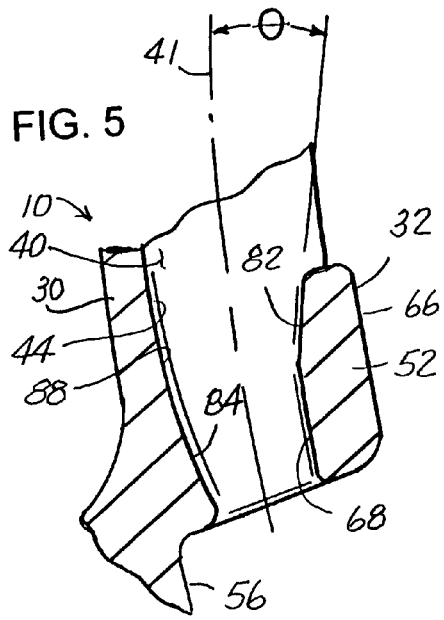
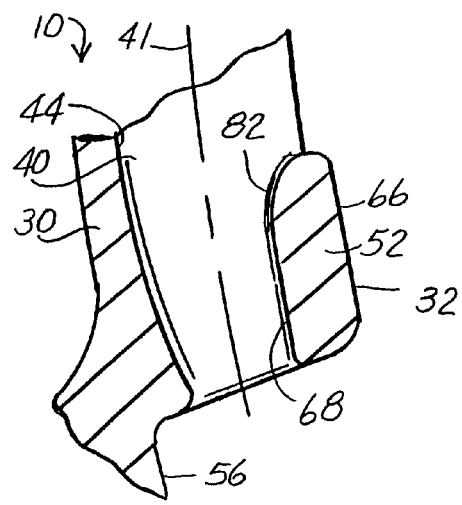
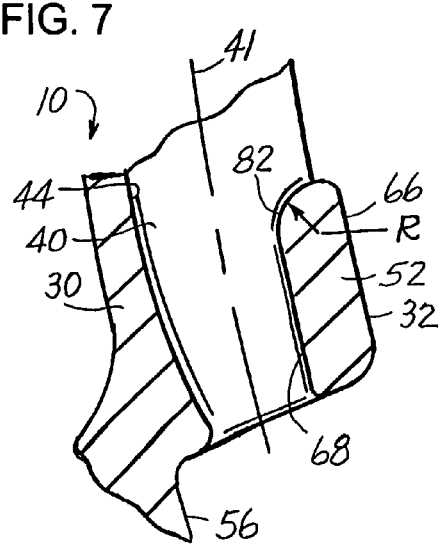
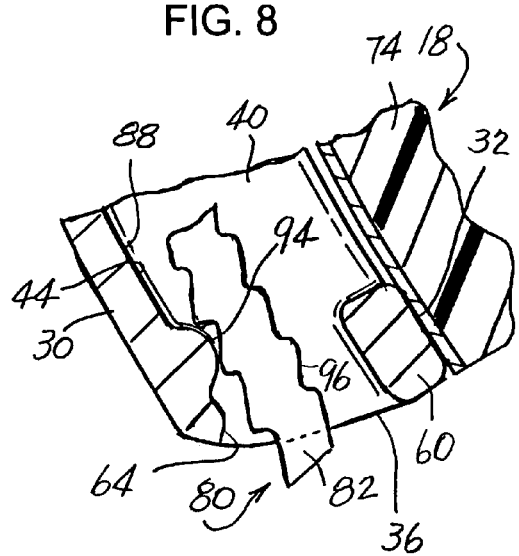

RAILCAR BRAKE HEAD

FIELD OF THE INVENTION

The present disclosure generally relates to railway freight cars and, more particularly, to a brake head for railway freight cars.

BACKGROUND OF THE INVENTION

Railway vehicles traditionally use a braking system wherein a brake shoe is mounted toward opposed ends of a brake beam and is selectively moved against a wheel surface of the vehicle to provide a retarding force. In most railway braking systems, the brake shoe is detachably mounted to a brake head used to locate the brake shoe and provide the braking force to the brake shoe.

A typical brake shoe includes a friction element carried by an arcuately configured metal backing plate. A keybridge extends outwardly from the backing plate and defines a pair of longitudinally spaced and generally aligned openings. The brake shoe keybridge is insertable between longitudinally spaced carrier lugs transversely extending across and formed as part of the brake head. The carrier lugs serve to support the brake shoe backing plate and inhibit the brake shoe from longitudinally shifting during a braking action. The brake head has certain standardized features and dimensions as established by the Mechanical Division of the Association of American Railroads (AAR) to allow interchangeability between brake shoes and brake beams made by different manufacturers.

The brake shoe keybridge area of the backing plate is formed in such a way that it is adapted to protrude into or intersect, at or near the longitudinal center of the brake head, with a longitudinally elongated keyway or channel formed in the brake head. An elongated brake shoe key, also of standard design, is manually insertable downwardly through the keyway or channel, behind the carrier lugs, and is designed to pass through the aligned openings in the brake shoe keybridge. By this insertion, the brake shoe is detachably assembled to each brake head.

Assembly of the brake shoe to the brake head by means of the brake shoe key has occasionally proved troublesome. The location of the brake head on the railcar makes proper insertion of the brake shoe key, used to hold the brake shoe and brake head in operable combination, awkward. Additionally, and because railroads operate on a round-the clock schedule, replacement of the brake shoes, requiring proper insertion of the brake shoe key to hold the replaced brake shoe and brake head in operable combination, must occasionally happen during periods of sever weather and at night. Accordingly, the person charged with replacement of the brake shoes is sometimes hurried to complete their task.

The design of the typical brake shoe, whether cast or formulated, also complicates proper insertion of the brake shoe key to hold the brake shoe and brake head in operable combination. That is, a conventional brake shoe has internal areas that can interfere with proper insertion of the brake shoe key into operable combination with the keybridge on the brake shoe. More specifically, the carrier lug arranged toward the longitudinal center of the brake head can interfere with endwise movement and proper insertion of the elongated key into the brake head. Such interference with key movement can cause the person inserting the key to erroneously and/or mistakenly believe the key has locked the brake shoe to the brake head. Since such interference, however, does not permit adequate insertion of the key, the brake shoe is not securely attached to the brake head. When a brake shoe key is not fully inserted, vibration of the railcar coupled with interaction between the shoe and brake head have a tendency to walk the brake key upward to further loosen the assembly. With a loose assembly, the brake shoe will not properly be held in place, will not likely contact the wheel correctly, and most likely the brake shoe will fall off. If the brake shoe falls off, the brake head will contact the wheel during braking causing possible detrimental damage to the both the wheel and brake head.

Thus, there is a continuing need and desire for a brake head which promotes passage of the brake shoe key through the keyway and into proper combination with the brake shoe keybridge so as to affect proper securement of the brake shoe key and brake head.

SUMMARY OF THE INVENTION

According to one aspect, there is provided a railcar brake head including a rigid elongated member having an upper end, a lower end, and a pair of sides. The member further includes an elongated concave keyway defining an elongated axis and opening to the upper and lower ends of the member. At least a portion of the keyway is defined between a rear wall of the member and spaced transversely extending upper and lower lugs. A front surface of each lug is adapted for mounting engagement with a rear face of a brake shoe. The longitudinal spacing between the upper and lower lugs is such that a keybridge extending from a rear face of the brake shoe is received and accommodated therebetween whereby inhibiting endwise movement of the brake shoe relative to the brake head. The upper lug is configured with a vertically elongated camming surface is arranged relative to the keyway for guiding and facilitating movement of a free end of an elongated key downwardly past the upper lug whereby permitting the key to establish a proper locking relation with the keybridge of the brake shoe.

In one form, the camming surface on the upper brake head lug for guiding and facilitating movement of the elongated key downwardly past the upper lug and into proper locking relation with the keybridge of the brake shoe defines an included angle ranging between about 10° and about 50° relative to the elongated axis of the keyway. In another form, the camming surface on the upper brake head lug for guiding and facilitating movement of the elongated key downwardly past the upper lug and into proper locking relation with the keybridge of the brake shoe has a generally curvi-linear surface configuration. In still another form, the camming surface on the upper brake head lug for guiding and facilitating movement of the elongated key downwardly past the upper lug and into proper locking relation with the keybridge of the brake shoe has a slanted and generally planar surface configuration.

Preferably, the rear wall of the rigid member forming the brake head defines a surface configuration for guiding movement of the free end of the key through the keybridge of the brake shoe. In another form, the lower end of the brake head member is configured to engage in operable combination with the key after the key is fully inserted into the brake head.

According to another aspect, there is provided a railcar brake head including a rigid elongated member having longitudinally spaced upper and lower ends. An elongated keyway, defining an elongated axis, opens to the upper and lower ends of the brake head member. A rear wall of the member is disposed to one side of the elongated axis and a plurality of spaced transversely extending lugs are disposed to an opposite side of the axis in spaced relation from the rear wall of the brake head member. A front surface of each lug is adapted for mounting engagement with a brake shoe and a rear surface of each lug is exposed to the keyway. At least one lug is disposed adjacent each end of the brake head member. Two brake head lugs are arranged in longitudinally spaced relation relative to each other and toward a longitudinal center of the brake head member. The longitudinal spacing between the two centrally disposed lugs is such that a keybridge extending from a rear face of a detachable brake shoe is accommodated in interlocking relation therebetween. A portion of at least one of the brake head lugs arranged toward a longitudinal center of the member has a vertically elongated camming surface which promotes movement of a free end of an elongated key therepast whereby permitting the key to move into proper locking relation with the keybridge of the brake shoe.

In one form, the camming surface on the brake head lug for promoting movement of the elongated key into proper locking relation with the keybridge of the brake shoe has a curvilinear profile. In another form, the surface on the brake head lug for promoting movement of the key into proper locking relation with the keybridge of the brake shoe has a planar slanted surface.

Preferably, the rear wall of the brake head member defines a surface configuration for guiding movement of a free end of the key through the keybridge of the brake shoe. In a preferred form, the lower end of the brake head member is configured to engage in operable combination with the key after the key is fully inserted into the brake head.

According to another aspect, there is provided a one-piece railcar brake head including a longitudinally elongated brake head section having an end guide section extending in a first generally transverse direction therefrom and an attachment section extending in a second generally transverse direction therefrom. The brake head section has longitudinally spaced upper and lower ends and an elongated keyway for receiving an elongated key. A portion of the keyway is defined between a concave rear wall and longitudinally spaced transversely extending lugs. Each lug has a front face adapted for mounting engagement with a detachable brake shoe and a rear face spaced from the rear wall of the brake head section. The longitudinal spacing between two of the lugs is such that a keybridge extending from a rear face of the detachable brake shoe can be arranged in interlocking relationship therewith so as to inhibit longitudinal movement of the brake shoe relative to the brake head section after the key is endwise inserted into operable combination with the keybridge. An upper end portion of the upper lug on the brake head section has an longitudinally elongated chamfer for facilitating movement of a free end of the key past the lug whereby permitting the key to move into locking relation with the keybridge on the brake shoe.

Preferably, the longitudinally elongated chamfer on the upper brake head section lug for facilitating movement of the free end of the key past the upper lug and into locking relation with the keybridge on the brake shoe has a generally curvilinear configuration. In another form, the longitudinally elongated chamfer on the portion of the upper lug for facilitating movement of the free end of the key past the upper lug and into locking relation with the keybridge on the brake shoe is angled between about 10° and about 40° relative to the longitudinal axis of the keyway.

In one form, the rear wall of the brake head section defines a camming surface configuration for guiding movement of a free end of the key toward the longitudinal axis and through the keybridge of the brake shoe. In another form, the lower end of the brake head section is configured to engage in operable combination with the key after the key is fully inserted into the brake head section.

BRIEF DESCRIPTION OF THE DRAWINGS

FIG. 2 is a front elevational view of one form of brake head embodying principals of the present disclosure;

FIG. 3 is a top plan view of the brake head shown in FIG. 2;

FIG. 5 is an enlarged view of the area encircled in dash lines FIG. 4;

FIG. 6 is an enlarged view of an alternative embodiment of that area encircled in FIG. 4;

FIG. 7 is an enlarged view of an another embodiment of that area encircled in FIG. 4; and FIG. 8 is an enlarged view of the lower end of the brake head having a brake shoe detachably secured thereto.

DETAILED DESCRIPTION OF THE INVENTION

Figure 1:
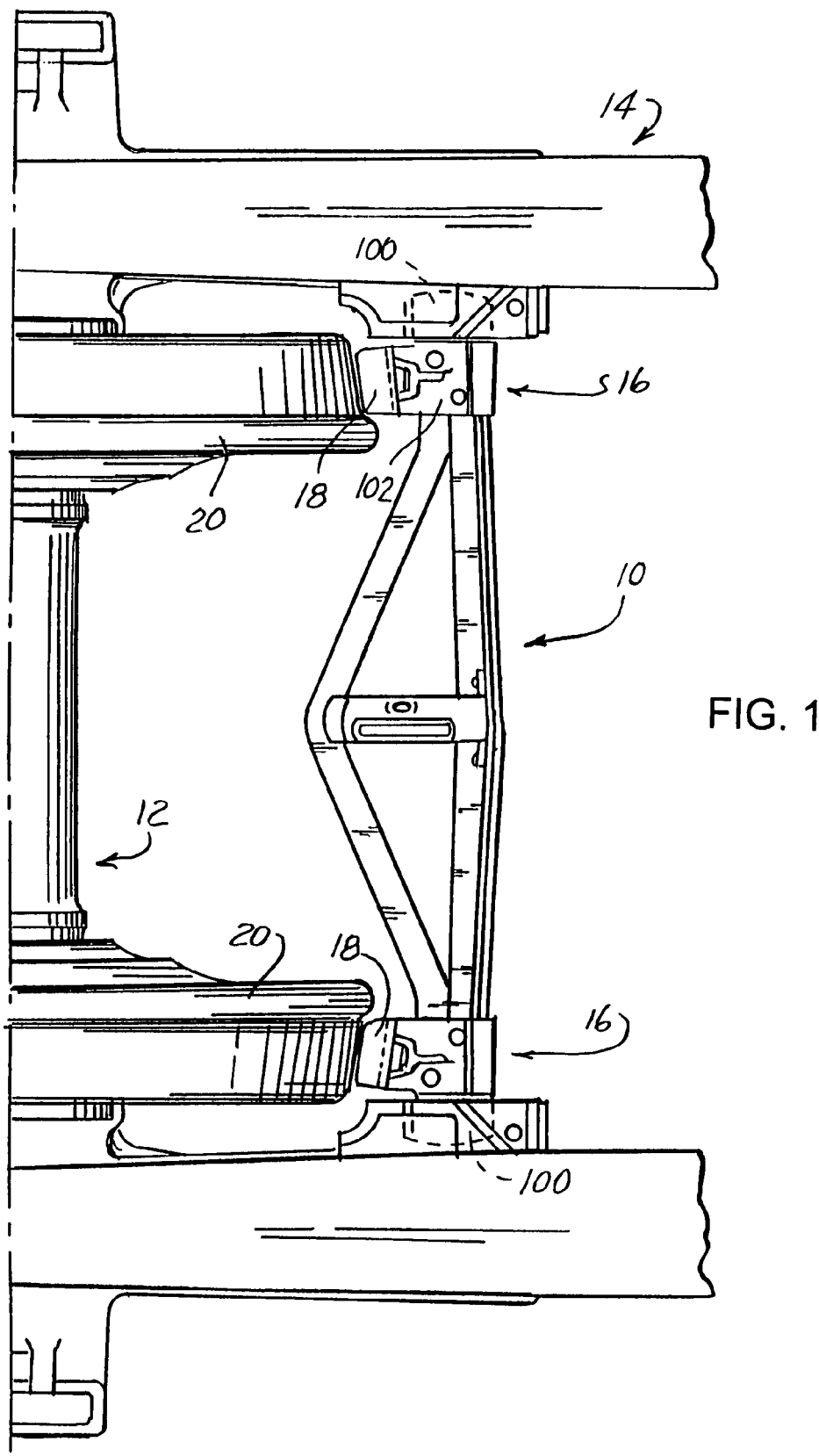
FIG. 1 is a broken plan view of a railcar truck having one form of brake beam arranged in operable combination therewith.

While the present invention is susceptible of embodiment in multiple forms, there is shown in the drawings and will hereinafter be described preferred embodiments, with the understanding the present disclosure is to be considered as setting forth only exemplifications of the invention which are not intended to limit the invention to the specific embodiments illustrated and described.

Referring now to the drawings, wherein like reference numerals indicate like parts throughout the several views, there is shown in FIG. 1 a railroad car brake beam, generally identified by reference numeral 10. In the illustrated example, brake beam 10 is of the type disclosed in U.S. Pat. No. 5,810,124 to Mr. R. Sandman; the applicable portions of which are incorporated herein by reference. From an understanding of the present disclosure, however, it will be appreciated certain principals and teachings of this disclosure equally apply to other railcar brake beams other than that illustrated by way of example in the present disclosure.

Brake beam 10 is located on one side of one pair of wheelsets 12 of a railroad car truck 14. As is understood by those skilled in the art, a pair of brake heads 16 are carried toward opposed ends of the elongated brake beam 10. Each brake head 16 carries a conventional brake shoe 18 in operable combination therewith. Each brake head 16 and brake shoe 18 are positioned to selectively engage a wheel 20 of the adjacent wheelset 12.

In one embodiment, the brake head 16 of the present disclosure is configured in substantial accordance with the Association of American Railroads "Manual of Standards and Recommended Practices", Section D, TRUCKS AND TRUCK DETAILS, Standard S-345-79 (Adopted 1875, Revised 1979), "Applicable Tolerances for Brake Beams, Hangerless Types" (See FIG. 12, page D-213). In particular, the brake head embodiments of the present disclosure are in substantial accordance with American Association of Railroads Standard S-371, "LIMITING CONTOUR OF BRAKE HEADS FOR HANGERLESS TYPE BRAKE BEAMS", appearing on page D-250 of such publication.

Figure 4:
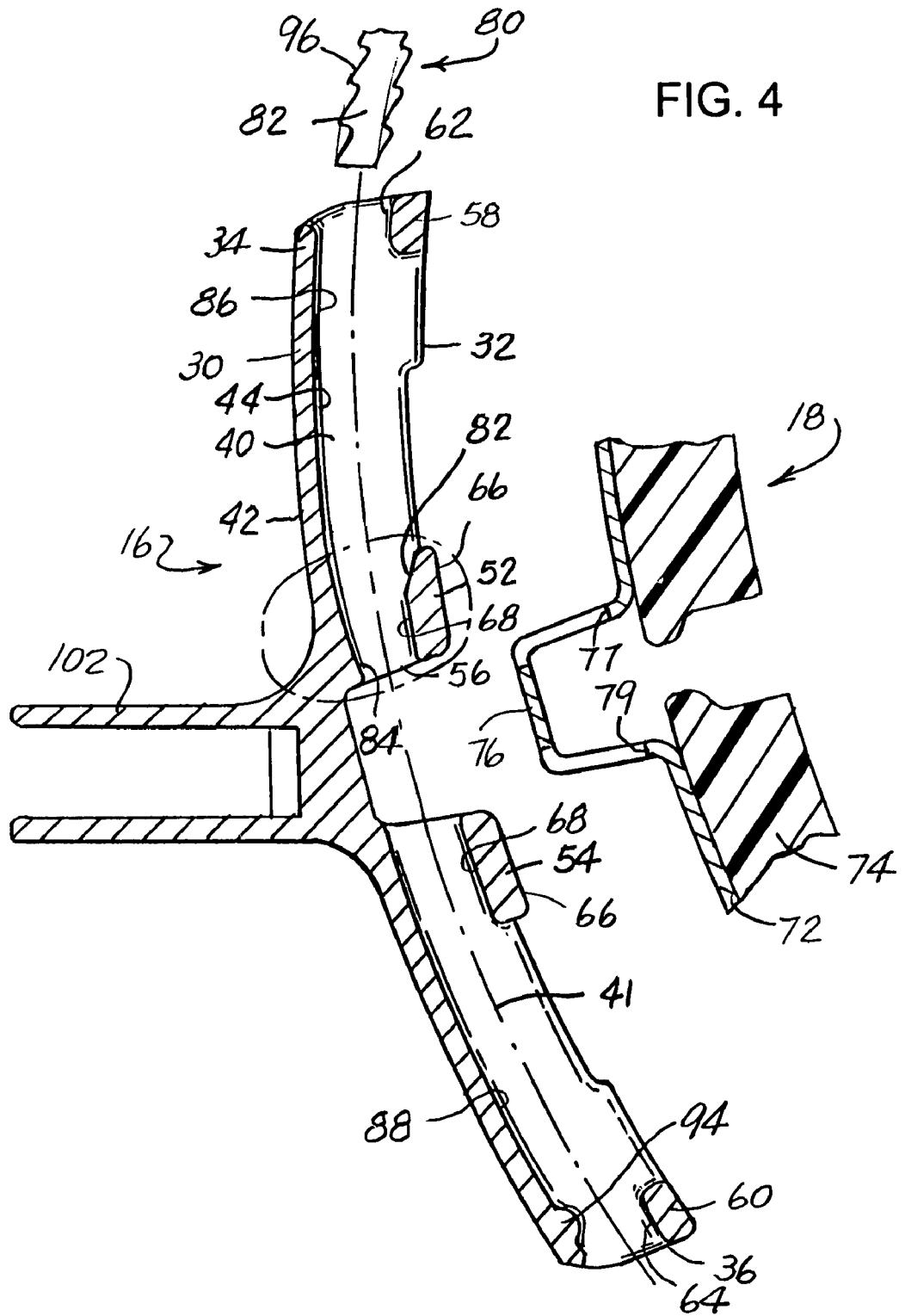
FIG. 4 is a longitudinal sectional view taken along line 4-4 of FIG. 3.

The brake head 16 of the present disclosure is shown in greater detail in FIGS. 2, 3 and 4. As shown, brake head 16 is preferably formed as an elongated and rigid one-piece member 30 defining an arcuate front or brake shoe receiving face 32. As shown, member 30 includes an upper end 34, a lower end 36, and a pair of transversely spaced sides 37 and 39 (FIGS. 2 and 3). The brake head 16 is further provided in the usual manner with an elongated keyway or channel 40 defining an elongated axis 41. As known, the keyway or channel 40 extends the length of the brake shoe 16 and opens to the ends 34, 36 of the brake head 16.

As shown in FIGS. 3 and 4, at least a portion of the keyway 40 is defined between a rear wall 42 of member 30 and upper and lower longitudinally spaced lugs or brake shoe carriers 52 and 54 arranged proximate to the longitudinal center of the brake head 16. As shown in FIG. 4, the rear wall 42 of member 30 defines a front surface 44 extending the majority of the length of the elongated keyway 40. The upper and lower lugs 52 and 54, respectively, each extend transversely across the brake head 16 and are arranged in spaced relation from the front face 44 of the brake head rear wall 42. As is known, the upper and lower lugs 52 and 54, respectively, combine with each other to define a recess 56 therebetween and which is generally centralized along the length of the brake shoe 16. In the illustrated embodiment, brake shoe 16 further includes brake shoe carrier lugs 58 and 60 disposed toward the upper and lower ends 34 and 36, respectively, of the brake head 16. In the embodiment illustrated in FIG. 4, brake head 16 defines upper and lower openings 62 and 64; with each opening 62, 64 having a closed margin.

As shown in FIG. 4, each lug 52, 54 includes a front face 66 and a rear face 68 disposed in predetermined fore-and aft relation relative to each other. As shown, the front face 66 of each lug 52, 54 serves to define a portion of the brake shoe receiving face 32 of the brake head 16.

The conventional brake head 18 is adapted to be detachably secured and supported by the arcuate front face 32 of each brake head 16. As is known, brake shoe 18 includes an arcuately shaped backing plate 72 and a brake lining 74. As is conventional, the curvature of the backing plate 72 generally parallels the curvature of the front face 32 of the brake head 16. Brake lining 74 is affixed, as by bonding or the like, to backing plate 72 and can be one of a composite type brake lining that is generally used in the railcar industry today.

In the example shown in FIG. 4, the brake shoe backing plate 72 is formed, generally at its midsection, with a generally U-shaped, integral keybridge 76 transversely extending across and projecting away from the backing plate 72. When the backing plate 72 of the brake shoe 70 is against the supporting or brake shoe receiving face 32 of brake shoe 16, the keybridge 76 is configured to protrude into or intersect with the longitudinally elongated keyway or channel 40 formed in the brake head 16. As is customary, the keybridge 76 is adapted to be received within the centralized recess 56 of the brake head 16 in interlocking relation with and between the upper and lower lugs 52 and 54, respectively, whereby inhibiting longitudinal shifting movement of the brake shoe 70 relative to the brake head 16. Each longitudinally spaced side of the keybridge 76 defines an opening or slot 77 and 79 which are generally aligned relative to each other.

Brake shoe 70 is detachably secured to the brake head 16 as with a longitudinally elongated spring type locking key 80. As is known, the locking key 80 includes a longitudinally elongated and flexible shank 82 configured to pass endwise through the upper opening 62 of the channel or keyway 40 and downwardly between the front surface 42 of the concave rear wall 40 of member 30 and the rear face 64 of the and upper and lower lugs 52 and 54, respectively, and through the aligned openings 77, 79 in the keybridge 76 whereby detachably securing the brake shoe 18 to the brake head 16. Key 80 is desirably formed from a steel strip and is configured to insure the required sturdiness of the key 80 when under tension in keyway 40 but no thicker than the keyway 40 receiving same.

The upper carrier lug 52 is formed with one of the principal improved features of the present disclosure. That is, the upper brake shoe carrier lug 52 is configured to guide and facilitate movement of a free end of the shank portion 82 of the elongated key 80 (FIG. 4) downwardly past the upper lug 52 whereby facilitating movement of the elongated key 80 into proper locking relation with the keybridge 76 of the brake shoe 18.

In the embodiment shown in FIG. 5, the carrier lug 52 of brake head 16 is provided with a camming surface 82 having a longitudinally elongated configuration extending primarily along the rear face 68 of the upper lug 52. In the embodiment shown by way of example in FIG. 5, camming surface 82 has a generally planar surface and defines an included angle θ ranging between about 10° and about 50° relative to the longitudinal axis 41 of the keyway 40 through which the shank 82 of key 80 (FIG. 4) extends. In a preferred form, camming surface 82 defines an included angle θ ranging between about 12° and about 25° relative to the longitudinal axis 41 of the keyway or channel 40 through which the shank 82 of key 80 (FIG. 4) extends.

Another embodiment of the camming surface 82 on the upper brake shoe carrier 52 is shown by way of example in FIG. 6. In the embodiment shown by way of example in FIG. 6, camming surface 82 has a curvi-linear longitudinally elongated configuration for guiding an facilitating movement of the a free end of the shank 82 of key 80 (FIG. 4) downwardly past the upper brake shoe carrier lug 52. As shown in FIG. 6, the curvi-linear configuration of surface 82 extends primarily along the rear face 68 of the upper lug 52.

Another embodiment of the camming surface 82 on the upper brake shoe carrier 52 is shown by way of example in FIG. 7. In the embodiment shown by way of example in FIG. 6, camming surface 82 has a radiused configuration. More specifically, in the embodiment illustrated in FIG. 7, the camming surface 82 is formed with a radius R which is generally equal to or greater than the one-half the distance between the front face 66 and rear face 68 of the upper brake shoe carrier lug 52.

In the illustrated form shown by example in FIG. 5, the front surface 44 of the rear wall 42 of member 30 is configured to guide movement of the free end of the shank 82 of key 80 toward and through the keybridge 76 of the brake shoe 18 (FIG. 4). In the embodiment shown in FIG. 4, the arcuately configured front face 44 of the rear wall 42 has an upper portion 86 extending for a majority of the longitudinal distance between the upper end 34 of member 30 and recess 56. In the embodiment shown in FIG. 4, the arcuately configured front face 44 of the rear wall 42 also has a lower portion 88 extending for a majority of the longitudinal distance between the lower end 36 of member 30 and recess 56.

As shown by way of example in FIG. 4, and toward a lower section of the upper portion 86 thereof, the rear wall front face 44 has a camming surface 84 for promoting movement of the free end of the shank 80 of key 80 toward the longitudinal axis 41 of keyway 40 and through the keybridge 76 of the brake shoe 18. In the form shown in FIG. 4, surface 84 terminates at the recess 56 and extends longitudinally toward the free or upper end 34 of member 30. In a preferred form, camming surface 84 extends for a longitudinal distance at least equal to or greater than the length of the carrier lug 52 on the opposite side of the keyway 40.

In the form shown by way of example in FIGS. 4 and 8, member 30 also includes a detent 94 arranged toward the lower end 36 thereof. More specifically, the lower portion 88 of the rear wall front face 44, adjacent to opening 64, is provided with an upstruck detent 94 which, as shown, extends toward the carrier lug 60.

As shown in FIGS. 4 and 8, a longitudinal portion toward the free end of key 80 has a conventional saw-tooth shape configuration 96. When the key 80 is fully inserted into the keyway 40, the saw-tooth configuration 96 at the free end of the key shank 82 cooperates with the detent 94 to releasably hold and inhibit inadvertent upward shifting movement of key 80 through the keyway 40 whereby maintaining the brake shoe 18 in detachably secured relation with the brake head 16.

When used in operable combination with a brake beam of the type shown in FIG. 1, brake head 18 typically forms a central part or section. That is, when used in operable combination with a brake beam of the type shown in FIG. 1, and as best shown in FIGS. 2 and 3, the elongated brake head section has an end guide section 100 extending in a first generally transverse direction therefrom and an attachment section 102 extending in a second generally transverse direction therefrom. As shown in FIG. 1, and as well known in the art, the end guide section 100 is adapted to support one end of the brake beam 10 and brake head structure on a side frame of the railcar truck 14. To reduce the overall weight of the brake head, the end guide section 100 preferably has a hollow configuration. Moreover, the attachment section 102 of the brake head shown for purposes of example in FIG. 1, is configured to facilitate securement of the brake head to one end of a tension member and compression member of brake beam 10 thereto.

When key 80 is inserted into and through the upper opening 62 defined by member 30 during replacement of a brake shoe, the front face of the 44 of the rear wall 42 of member 30 guides the key toward the keybridge 76. As key 80 approaches the keybridge 76, the camming surface 84 on the upper portion 86 of the rear wall front face of the 44 serves to guide the free end of the key 80 toward the longitudinal centerline 41 of the keyway 40 whereby insuring proper passage of the key through the keybridge 76. On the opposite side of the longitudinal axis 41 of keyway 40, camming surface 82 guides the free end of the key 80 past the upper brake shoe carrier lug 52 for proper passage through the keybridge 76. With camming surface 82 having a relative shallow angle of inclination or repose relative to the longitudinal axis 41 of keyway 40, the upper lug 52 offers minimal resistance to insertion of the key 80 through the keyway 40. In one form, the distance between the innermost faces of the camming surfaces 82 and 84 is such that key 80 is guided therebetween with precision and conciseness thereby promoting continued endwise movement of the key 80 into proper locking relation with the brake head 16 and brake shoe 18 so as to maintain the brake shoe 18 in proper relation with the brake head 16 during the full life of the brake shoe 18.

To further maintain brake head 16 and brake shoe 18 in proper relation relative to each other, the detent 94 arranged toward the lower end 36 of member 30 serves to releasably capture and hold the key 80 against inadvertent axial displacement in the keyway or channel 40. Of course, the holding force applied by detent 94 to key 80 still allows the key 80 to be removed when the brake head 18 is to be purposefully removed or replaced.

From the foregoing, it will be observed that numerous modifications and variations can be made and effected without departing or detracting from the true spirit and novel concept of the present invention. Moreover, it will be appreciated, the present invention disclosure is intended to set forth exemplifications which are not intended to limit the invention disclosure to the specific embodiments illustrated. Rather, this invention disclosure is intended to cover by the appended claims all such modifications and variations as fall within the spirit and scope of the claims.

What is claimed is:

1. A railcar brake head comprising: a rigid elongated member having an upper end, a lower end, and a pair of sides extending between said ends, with said member further including an elongated concave keyway defining an elongated axis and opening to said upper and lower ends of said member, with at least a portion of said keyway being defined between a rear wall of said member and spaced upper and lower lugs transversely extending between the sides of said member, with a front surface of each lug being adapted for mounting engagement with a rear face of a brake shoe, and with the spacing between said upper and lower lugs being such that a keybridge extending from the rear face of said brake shoe is received and accommodated therebetween whereby inhibiting endwise movement of said brake shoe relative to said brake head, and wherein an upper end of said upper lug is configured with a vertically elongated camming surface slanting in the insertion direction of an elongated key and toward the elongated axis of said keyway for guiding and facilitating movement of a free end of said elongated key downwardly past said upper lug whereby facilitating movement of the elongated key into proper locking relation with the keybridge of said brake shoe, and with said upper and lower lugs having an asymmetrical configuration relative to each other.

2. The railcar brake head according to claim 1 wherein, said camming surface on the upper lug of said brake shoe member defines an included angle ranging between about 10° and about 50° relative to the longitudinal axis of said keyway.

3. The railcar brake head according to claim 1 wherein, the camming surface on said upper lug for guiding and facilitating movement of the free end of said elongated key downwardly past said upper lug has a curvi-linear configuration.

4. The railcar brake head according to claim 1 wherein said camming surface on the upper lug of said brake shoe member for guiding and facilitating movement of an elongated key downwardly past said upper lug has a generally planar configuration.

5. The railcar brake head according to claim 1 wherein, the rear wall of said member has a surface configuration for guiding movement of the free end of said key through the keybridge of said brake shoe.

6. The railcar brake head according to claim 1 wherein, the lower end of said brake shoe member is configured to engage in operable combination with the free end of said key after sad key is fully inserted into said brake head.

7. A railcar brake head comprising: a rigid elongated member having longitudinally spaced upper and lower ends and a pair of sides extending between said ends, an elongated keyway defining an elongated axis and opening to said upper and lower ends of said member, with a rear wall of said member being disposed to one side of said elongated axis, a plurality of lugs transversely extending between said sides and disposed to an opposite side of said axis in spaced relation from said rear wall, with a front surface of each lug being adapted for mounting engagement with a rear face of a brake shoe and with a rear surface of each lug being exposed to said keyway, and wherein at least one lug is disposed adjacent each end of said member, and with two of said lugs being arranged in longitudinally spaced relation relative to each other and toward a longitudinal center of said member, with the longitudinal spacing between said two of said lugs being such that a keybridge extending from a rear face of a detachable brake show is accommodated in interlocking relation therebetween, and wherein an upper end portion of at least one of said two lugs toward a longitudinal center of said member has a vertically elongated camming surface slanting in the insertion direction of an elongated key and toward the elongated axis of said keyway for promoting movement of a free end of said elongated key toward the elongated axis of said brake shoe member and past said at least one of said two lugs toward a longitudinal center of said member whereby promoting movement of the elongated key into proper locking relation with the keybridge of said brake shoe, and with said upper and lower lugs having an asymmetrical configuration relative to each other.

8. The railcar brake head according to claim 7 wherein, the camming surface on said at least one of said two lugs for promoting movement of the free end of said elongated key past said at least one of said two lugs toward a longitudinal center of said member has a curvilinear profile.

9. The railcar brake head according to claim 7 wherein, the camming surface on said at least one of said two lugs for promoting movement of the free end of said elongated key past said at least one of said two lugs toward a longitudinal center of said member has a planar surface configuration.

10. The railcar brake head according to claim 7 wherein, the rear wall of said brake head member is configured to promote movement of the free end of said key toward the elongated axis and through the keybridge of said brake shoe.

11. The railcar brake head according to claim 8 wherein, the lower end of said brake head member to engage in operable combination with the free end of said key after sad key is fully inserted into said brake head.

12. A one-piece railcar brake head comprising: a longitudinally elongated brake head section having an end guide section extending in a first generally transverse direction therefrom and an attachment section extending in a second generally transverse direction therefrom, with said brake head section having longitudinally spaced upper and lower ends and an elongated keyway opening for receiving an elongated insertable key, with a portion of said keyway being defined between a concave rear wall and longitudinally spaced transversely extending lugs, with each lug having a front face adapted for mounting engagement with a rear face of a detachable brake shoe and a rear face spaced from said rear wall, with the longitudinal spacing between said lugs being such that a keybridge extending from the rear face of the detachable brake shoe arranged in interlocking relationship therewith so as to inhibit longitudinal movement of the brake shoe relative to the brake head section after a key is endwise inserted through said keyway and into operable combination with said keybridge, and wherein an upper end portion of the upper lug has an longitudinally elongated chamfer slanting in the insertion direction of the elongated key and toward the rear wall of said brake head for facilitating movement of a free end of said key past said lug and whereby promoting movement of said key into locking relation with the keybridge on said brake shoe, and with said upper and lower lugs having an asymmetrical configuration relative to each other.

13. The one-piece railcar brake head according to claim 12 wherein, the longitudinally elongated chamfer on the portion of said upper lug for facilitating movement of said key past said upper lug has a generally curvi-linear configuration.

14. The one-piece railcar brake head according to claim 13 wherein, the longitudinally elongated chamfer on the portion of said upper lug is angled between about 10° and about 45° relative to the elongated axis of said keyway.

15. The one-piece railcar brake head according to claim 12 wherein, the rear wall of the brake head section is configured for promoting movement of the free end of said key through the keybridge of said brake shoe.

16. The one-piece railcar brake head according to claim 12 wherein, the lower end of said brake head section is configured to engage in operable combination with the free end of said key after said key is fully inserted into said brake head section.

* * * * *